No. 705,641. Patented July 29, 1902.
J. BRITNELL.
CORSET FASTENER.
(Application filed Apr. 22, 1901.)

(No Model.)

Witnesses
J. J. Rowley
F. M. Mellor

Inventor
James Britnell
per
J. B. Fleuret
attorney.

UNITED STATES PATENT OFFICE.

JAMES BRITNELL, OF HIGH WYCOMBE, ENGLAND.

CORSET-FASTENER.

SPECIFICATION forming part of Letters Patent No. 705,641, dated July 29, 1902.

Application filed April 22, 1901. Serial No. 56,966. (No model.)

*To all whom it may concern:*

Be it known that I, JAMES BRITNELL, chairmaker, a subject of the King of Great Britain and Ireland, residing at 84 West Wycombe road, High Wycombe, in the county of Bucks, England, have invented certain new and useful Improvements in Corset-Fasteners, of which the following is a specification.

This invention relates to a corset-fastener fitted to the ordinary stay busks or steels; and it consists, essentially, in the use of a disk or plate pivoted to the eyelet forming the usual fastening attached to one of the busks or steels. The said disk or plate has its pivotal axis placed eccentrically with the hole in the eyelet and is itself formed with a hole of similar size to that of the eyelet and so arranged that when the disk or plate is in one position the said hole lies over or coincides in position with the hole in the eyelet. By this means the corresponding stud on the opposite busk may be engaged with the eyelet in the usual manner and with the hole in the disk or plate. The disk or plate is also formed with a curved slot extending from one side of and opening into the hole therein, but of lesser width than the diameter of the hole, the said width being sufficient to permit of the free passage of the stem of the stud therethrough, but preventing the passage of the head of the stud. The radius of the said slot is struck from or about the pivotal axis of the disk or plate, and the latter is formed with two notches or projections which bear against a stud or stop on the eyelet-plate for limiting the turning of the disk or plate in its locked or unlocked position. The stud is locked to the eyelet by turning the disk or plate so that its slot engages with the stem of the stud, and it is unlocked by a reverse turning movement of the disk or plate.

Figure 1:
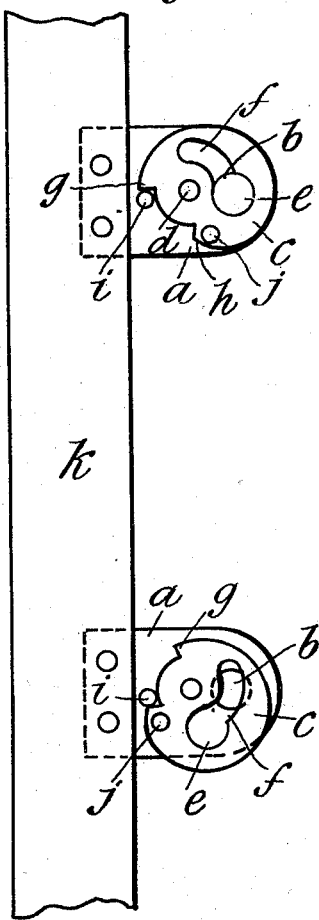
Figure 2:
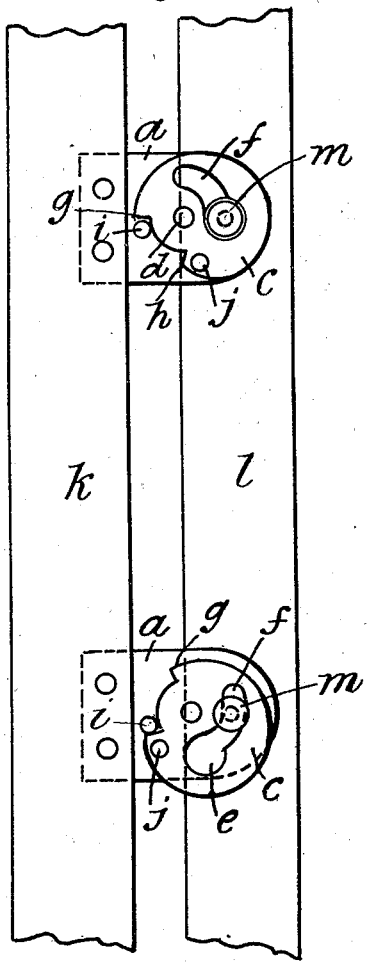
Figure 3:
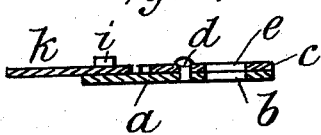

In the sheet of drawings accompanying this specification is shown, in Figure 1, a portion of a corset busk or steel, to an enlarged scale, with the improved fastener fitted thereto, the upper fastener being in its unlocked position and the lower one in its locked position. Fig. 2 is a similar view showing the fasteners engaged with the studs on the opposite busk, and Fig. 3 is a cross-section of the busk and fastener.

$a$ is the ordinary eyelet, and $b$ the hole formed therein for receiving the stud.

$c$ is the disk or plate, pivoted at $d$ to the eyelet-plate $a$, and $e$ is the hole formed therein for the passage of the head of the stud when fastening or unfastening the corset.

$f$ is the curved slot extending from the hole $e$.

$g$ and $h$ are the two notches formed on the disk $c$, and $i$ is the stud or stop fixed to the plate $a$, engaging with the notches.

$j$ is a stud or pin fixed to the disk $c$ for turning the same.

$k$ is the corset-busk, to which the eyelets $a$ are riveted, and $l$ is the opposite busk, to which the studs $m$ are attached.

In order to fasten the busks together, the head of the stud $m$ is passed through the holes $b$ and $e$, as shown at the upper part of Fig. 2. The disk or plate $c$ is then turned by means of the stud or pin $j$ until the notch $h$ bears against the stop $i$, as shown at the lower part of Fig. 2. By this means the slotted portion of the disk or plate $c$ is brought beneath the head of the stud $m$, thus preventing the stud from being withdrawn from the eyelet and securely locking the busks together.

For unfastening the corset the disk $c$ is turned back into the position shown in the upper portions of the figures, in which the holes $b$ and $e$ coincide in position, thus permitting of the stud-head passing therethrough.

Having now fully described the nature of my said invention, what I claim, and desire to secure by Letters Patent, is—

In corset-fasteners the combination with an eyelet attachment on one of the busks of a disk pivoted thereto and whose pivotal axis is eccentric with the center of the hole in the eyelet, a hole in said disk the same size as the eyelet-hole, a curved slot extending from one side of the hole in the disk but of lesser width than said hole and whose radius is struck from the pivotal axis of the disk, two notches or projections formed on the disk, for engaging with a stud or stop on the eyelet-plate, for limiting its motion to its locked and unlocked positions, and a stud or pin on the disk for operating the same, a stud on the opposite busk engaging with the hole and slot in the disk for fastening the two busks together, substantially as described.

In witness whereof I have hereunto set my hand in the presence of two witnesses.

JAMES BRITNELL.

Witnesses:
GEORGE KEEN,
JOHN TOWERTON.